(No Model.)
F. BATTER.
HYDROSTATIC WEIGHING SCALE.
No. 403,452. Patented May 14, 1889.
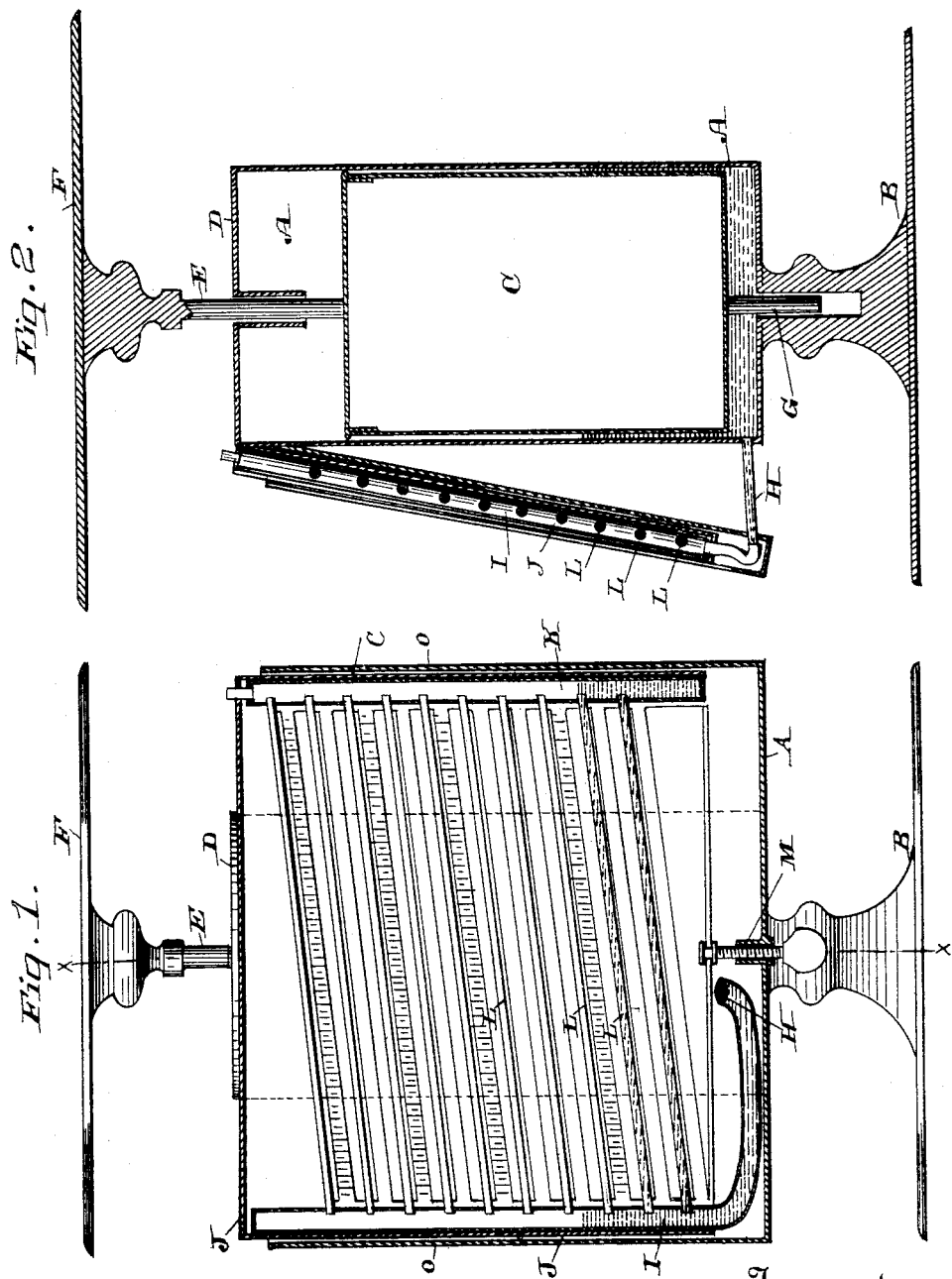
Witnesses,
Geo. H. Strong.
J. H. Rouse
Inventor,
Frank Batter
By Dewey & Co.
atty

UNITED STATES PATENT OFFICE.

FRANK BATTER, OF SLIDE, CALIFORNIA, ASSIGNOR OF ONE-HALF TO W. S. VANDERBURG, OF MARSHFIELD, OREGON.

HYDROSTATIC WEIGHING-SCALE.

SPECIFICATION forming part of Letters Patent No. 403,452, dated May 14, 1889.

Application filed December 22, 1888. Serial No. 294,407. (No model.)

*To all whom it may concern:*

Be it known that I, FRANK BATTER, of Slide, Humboldt county, State of California, have invented an Improvement in Hydrostatic Weighing-Scales; and I hereby declare the following to be a full, clear, and exact description of the same.

My invention relates to an improved weighing-scale; and it consists of a chamber with a rising and falling float fitted therein, said float having a pan for the support of the article to be weighed, and in connection with the chamber of a scale consisting of a series of diagonally-arranged pipes connected with the chamber and having graduations marked from end to end, as will be more fully explained by reference to the accompanying drawings, in which—

Figure 1 is a sectional view through the casing, showing the scale frame or dial, the diagonally-arranged tubes of the scale, and the vertically-arranged tubes at each end which the scale-tubes connect. Fig. 2 is a vertical section taken through X X of Fig. 1.

A is a chamber, which in the present case I have shown cylindrical in form for convenience. This chamber is supported upon a base, B, of sufficient size to hold it steady.

C is a float, shaped to correspond with the chamber and fitting closely therein, so as to rise and fall smoothly and without friction. Through the cover D of the outer chamber a central opening is made, and the stem E at the upper end of the float extends through this opening and supports the scale-pan F. At the lower end of the float is a guide-stem, G, which enters a correspondingly-shaped opening in the base, so that the float shall rise and fall with the least possible friction.

The chamber A is supplied with the proper quantity of liquid, in which the float contained within the chamber will be suspended. The liquid may be any well-known substance which is found desirable for this purpose, either quicksilver, alcohol, or spirits of any kind, oil, or water, it being necessary only to employ some substance which will not deteriorate with continual use, and which will not be subject to a too rapid evaporation, although this may be controlled by reason of the chamber being hermetically sealed or closed after the liquid has been introduced. A sufficient quantity of liquid being placed in the chamber, the float rises to the top, and, carrying with it the scale-pan, any weight placed upon this pan will depress the float correspondingly, and the liquid, rising up around the sides of the float or into any passage connecting with the lower part of the chamber, will, when it reaches a certain height, counterbalance the weight upon the scale-pan. In order to indicate what the weight may be, I connect the lower part of the chamber by means of any suitable tube, H, with an approximately vertical tube, I, which is supported within the scale-frame J, as shown. Upon the opposite side of this frame is a similar vertically-disposed tube, K.

L L are a series of tubes extending from one of the vertical pipes to the other, and so inclined that the lower ends being connected with the left-hand pipe, I, the upper end of each of the tubes connecting with the right-hand vertical tube or pipe, K, will be as high as the lower end of the next succeeding inclined pipe, and so on from the bottom to the top. Each of these inclined pipes is subdivided and a scale marked upon it, or upon some corresponding part of the scale-frame in close proximity with the inclined tube.

The scale frame or dial J may be of any suitable or desired color, and the liquid contained in the float-chamber, and which also flows into the pipes above-described, may be colored, so that its presence will be easily noted.

M is a regulating-screw, which enters the lower part of the frame, and by turning it up or down it raises or depresses the dial and pipes independent of the position of the float, the dial sliding in guides O, as shown.

The operation of the device will then be as follows: The weight being placed upon the scale-pan depresses the float and causes the liquid to rise correspondingly in the chamber, and, flowing through the connecting-pipe H from the chamber, it enters the left-hand vertical tube, I, rising into and filling as many of the inclined tubes L as are below the level of its surface in the float-chamber. The liquid will extend along the upper inclined tube until it reaches a point opposite some one of the graduated lines of the inclined tube, thus showing the subdivisions of an ounce or other unit of measurement which may be adopted for the scale. Each of the inclined tubes is intended to represent one unit of measurement, as one ounce, and by noting the number of tubes which are filled with the liquid the number of units will be known and the fractions of the unit will be indicated by the figures marked along the dial or upon the inclined tubes, as above described. The left-hand vertical tube is closed at the top, the bottom connecting with the float-chamber. The right-hand vertical tube is closed at the bottom and has a small protected ventilating-passage at the top to allow the air to pass freely, so as to prevent its pressure from affecting the movement of the liquid.

This weighing-scale may be used for any purposes for which any weighing-scale can be employed, and if it be desired to use a variety of substances in the mixture the containing-vessel may be first weighed upon the scale-pan, then by turning the regulating-screw the liquid may be brought back to the beginning of one of the inclined tubes, and the first substance to be weighed being placed in the containing-vessel, its weight being ascertained, the liquid may be brought back to the beginning or lower end of the tube, in which it stands, and the next ingredient accurately weighed, and so on until the whole is completed.

Having thus described my invention, what I claim as new, and desire to secure by Letters Patent, is—

1. A weighing-scale having a float-chamber, a float disposed so as to rise and fall in said chamber and having a scale-pan supported upon it, in combination with an indicating dial or scale, said scale consisting of the inclined tubes, the lower one of which is connected with the float-chamber, the ends of all the tubes being so connected that the liquid may flow from one to another until it reaches the level of the surface within the float-chamber, substantially as described.

2. A weighing-scale comprising a float-chamber containing liquid, a float suspended therein and carrying a scale-pan, and an indicating dial or scale consisting of vertical tubes, one of which is connected with a float-chamber, and a series of inclined tubes extending between the vertical tubes, so that the upper end of each of the inclined tubes is on a level with the lower end of the succeeding tube above, said tubes being subdivided and marked to indicate fractions of the unit, substantially as herein described.

3. The float-chamber, the vertically-moving float suspended therein and supporting the scale-pan, in combination with the indicating dial or scale consisting of a series of inclined tubes having their ends connected with approximately vertical tubes, one of which is connected with the float-chamber, the vertical distance between the inclined tubes representing the unit of weight, and a series of subdivisions marked from end to end of the inclined tubes indicating the fractional subdivisions of the unit, substantially as described.

4. The float-chamber, the vertically-moving float suspended therein and carrying the scale-pan, in combination with the dial or scale consisting of the inclined subdivided tubes having their ends connected with approximately vertical tubes, the lower end of one of which is connected with the float-chamber and the upper end of the other provided with an opening for the free passage of air, together with the regulating or adjusting screw, whereby the level of the liquid may be changed in the dial-tube, substantially as herein described.

5. In a weighing-scale, a float-chamber, a vertically-moving float suspended therein and carrying a scale-pan, in combination with a dial having vertical tubes at its ends connected with the float-chamber, and inclined connecting-tubes extending between them, said dial and tubes being vertically adjustable with relation to the float-chamber, substantially as herein described.

In witness whereof I have hereunto set my hand.

FRANK BATTER.

Witnesses:
S. H. HAZARD,
JEAN TSEHIEMBER.